Jan. 7, 1969    V. L. KIPPING    3,420,605

WIDE FIELD PHOTOGRAPHY AND PROJECTION

Filed June 14, 1965

INVENTOR.
VERNON L. KIPPING
BY
ATTORNEY

3,420,605
WIDE FIELD PHOTOGRAPHY AND PROJECTION
Vernon L. Kipping, 540 Melrose Ave.,
San Francisco, Calif. 94127
Filed June 14, 1965, Ser. No. 463,479
U.S. Cl. 352—69                                5 Claims
Int. Cl. G03b 37/00

---

ABSTRACT OF THE DISCLOSURE

A camera having ultra-wide-angle optics is directed vertically upward to photograph the entire hemisphere surrounding the camera. The film is processed in the usual manner. An auditorium for an audience is provided with a hemispherical concave translucent screen. The projector for the film is located outside the auditorium and projects onto the convex surface of the screen.

---

This invention relates to a new and improved method and apparatus for photographing wide field objects and subsequently projecting them on a dome-shaped screen. More particularly, the invention relates to a method of photography wherein a camera with ultra-wide-angle optics is directed vertically so that the entire hemisphere surrounding the camera is recorded as a compressed image on the film plane. The recorded image on the film appears distorted, but represents an image covering at least 180° in the vertical plane, and 360° in the horizontal plane. When the anamorphic film image is projected vertically onto a hemispherical or parabolic screen, each segment of the film image is projected onto a point on the screen which proximates the position of the object as placed in the original scene photographed such that the screen image observed by viewers is undistorted. The image is folded from a hemispherical object field onto a flat film plane in the camera and then "unfolded" again by projection apparatus onto the properly-shaped screen.

A principal advantage of the present invention is that it is most usefully employed in conjunction with rear projection. When used in conjunction with rear projection, the screen is translucent and may be rigid or flexible. Such a flexible screen may be maintained in its proper position by means of a vacuum above the screen or air pressure within. Such a dome-shaped screen totally covers the audience, which then views images appearing on the underside of the screen produced by rear projection on the top side of the dome-shaped screen.

A further advantage of the present invention is the fact that a sense of audience participation and of "presence" at the actual scene photographed is greatly enhanced by the fact that the screen actually encompasses the total audience and fills the entire field of vision of the viewers.

A still further advantage of this invention is the fact that conventional front projection may be utilized, in conjunction with present theatre structures.

A further feature of the present invention is the fact that a portable theatre may be constructed utilizing a flexible parabolic dome-screen enclosing the audience used in conjunction with air pressure to maintain the screen in the proper position. When constructed with prefabricated materials such a theatre may be set up and dismantled within a short time.

A still further feature of this invention is the fact that it may be used in conjunction with 180° field of view projected on a parabolic or hemispherical screen set on its side. When so used, the filming camera and lens are directed generally parallel to the ground such that a center of interest is produced at the central portion of the image. When such a film is projected, the audience views horizontally the interior of the shell-like parabolic screen onto which the image is projected from a projector directed substantially parallel to the ground. In such a system, a center of interest is produced at the center of the screen such that it is suitable for telling a story.

Other objects of the present invention will become apparent upon reading the following specification and referring to the accompanying drawings.

In an attempt to produce a high degree of subjective audience participation, a number of methods have been used to project moving picture images on wide screens or screens totally surrounding the audience. However, all of the prior methods have been deficient in that the viewer was required to ignore or to fill in with his imagination those areas in his field of vision which were not part of the projected image. The present method and apparatus provides a high degree of "presence" on the part of the audience because the viewer's total field of vision is filled with images projected on a dome-shaped projection screen which totally envelops the viewer.

Figure 1:
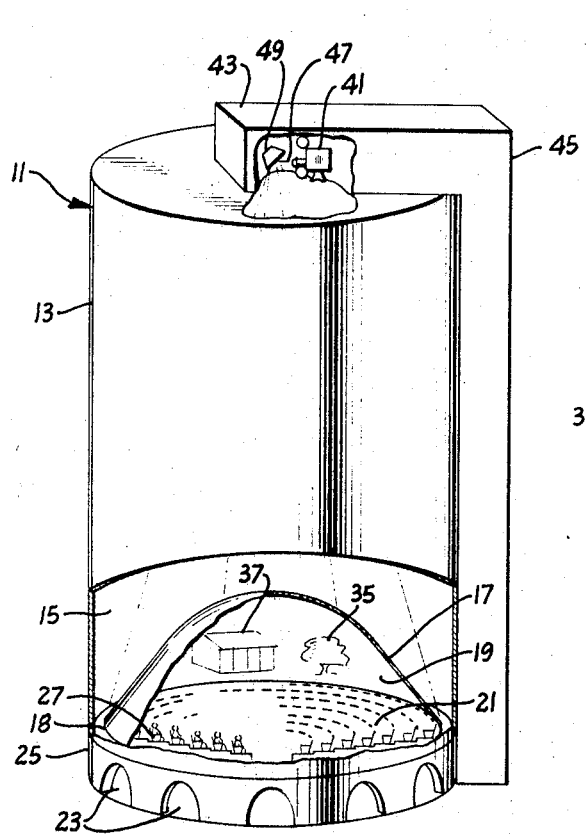
FIG. 1 is a schematic perspective view of a theatre employing a 360° dome-projection screen embodying the present invention.

In FIG. 1, 360° movie theatre 11 embodying the present "Cinesphere" process is enclosed by outer shell 13 composed of suitable building material such as aluminum secured to a suitable structural framework (not shown). Outer shell 13 is both airtight and light impervious. Area 15 within shell 13 may have its air pressure lowered sufficiently by suitable air pumps (not shown) to cause flexible projection dome 17 to be drawn upwardly to fill the partial vacuum in space 15 by normal air pressure below the screen in space 19. Or, alternatively, space 19 in which the audience sits may be inflated by a differential air pressure slightly above atmospheric pressure to cause projection dome 17 to be inflated to its proper shape as shown in FIG. 1. Projection dome 17 being of suitable flexible material is drawn upward by a vacuum in space 15 or inflated by differential air pressure in space 19. Suitable safety means attached to projection dome 17 in shell interior 15 prevent dome 17 from collapsing accidentally on the audience in theatre auditorium 21.

The audience gains admittance to theatre 11 through doors 23 in the audience structure 25. From there the audience proceeds upward to auditorium 21 in which chairs 27 are arranged in a series of circular rows such that the spectator observes that portion of the screen opposite him and that when the spectator reclines in his seat 27, subtantially his entire field of vision is filled by the projected image. Because the horizon of the screen 17 is at the same level as it occurred in the original scene, the spectator is given the feeling of being present at the original scene. Thus a high degree of subjective audience participation is present with use of the present method. Seats 27 may be of the reclining type to enable the participants to lean back with comfort and allow the dome projection screen 17 to fill their entire field of view.

Figure 2:
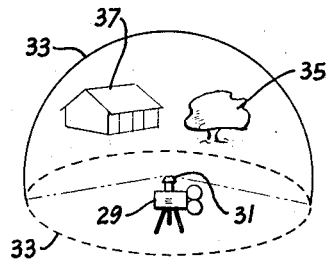
FIG. 2 is a schematic view of a movie camera used to record an image covering a 360° horizontal view and a 180° vertical view.

With photographing a scene as shown in FIG. 2 the camera 29 and camera lens 31, are directed substantially vertically as shown. The field of view covered by special lens 31 is represented diagrammatically by means of dotted line 33. Thus it is seen that lens 31 captures a total image of 360° in the horizontal plane and at least 180° in the vertical plane. Tree 35 and house 37 are used as examples to illustrate the image reproducing process described herein.

Figure 3:
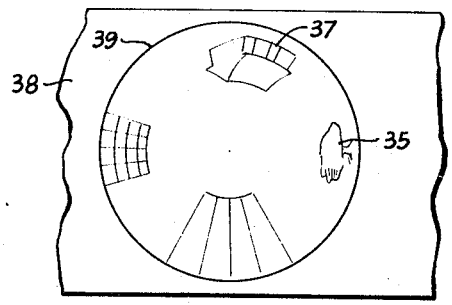
FIG. 3 is plan view showing the film image recorded by the camera and lens arrangement shown in FIG. 2.

An anamorphic image is reproduced on light sensitive film 38 in camera 29. Such an image 39, is represented schematically in FIG. 3. Because of the transference of the dome-shaped image onto the flat plane of the film, tree 35 and house 37 (as illustrative of images reproduced) are shown in a distorted anamorphic shape in image 39 in FIG. 3. Film 38 is developed in the conventional manner and printed for use in projection.

In projecting image 39 to produce a reproduction of the original scene as photographed, image 39 on film 38 is projected substantially vertically downwards onto a dome-shaped projection screen such as that shown at 17 in FIG. 1. Projector 41 is situated in projection room 43 atop theatre 11. Access to projection room 43 is provided by elevator 45. Film 38 is projected by projector 41 through projection lens 47 onto reflector 49 so as to project enlarged anamorphic image 39 downwardly onto the outer convex surface of dome-shaped projection screen 17. Due to the configuration of dome screen 17, the compressed anamorphic image 39 is reconstituted into an undistorted screen image when observed by viewers in auditorium 21. This effect is illustrated by referring to building image 37 and tree image 35 shown rectified on dome screen 17 in FIG. 1 in their proper shape and relative position, the same as when originally photographed as shown in FIG. 2. Additionally, a subjective three-dimensional effect is produced because the image projected onto dome screen 17 lies at varying distances from any given viewer and virtually fills the entire peripheral field of view of the spectators. The effect is to produce a highly realistic illusion of three dimensions, although no objective three-dimensional image is produced in the strict sense of the term.

Figure 4:
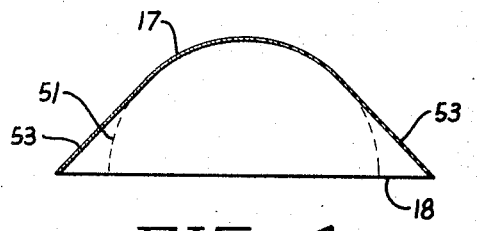
FIG. 4 is a sectional side view showing a parabolic projection screen configuration.

Dome screen 17 is substantially of a parabolic shape in cross-section as shown in FIG. 4. A true hemisphere would follow the shape shown as dotted line 51. The lower edges 53 of screen 17 must depart from the ideal hemispherical shape to allow the projected image from projector 41 to impinge on all portions of projection screen 17. Camera lens 31 may be of the commercially available "Fisheye" type which records a 360° image 39 when used in manner shown in FIG. 2. Therefore the image projected on screen 17 substantially reproduces the objects photographed by camera 29. A modification not shown is the provision for conventional front projection onto screen 17 by a projector placed beneath the level of screen 17 to reduce the space required in theatre 11.

Figure 5:
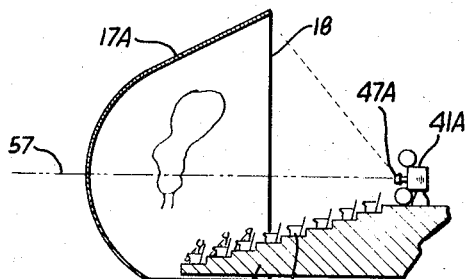
FIG. 5 is a schematic sectional view showing a modification of a parabolic screen standing on edge, to present a 180° field of view, used in conjunction with front projection.
Figure 6:
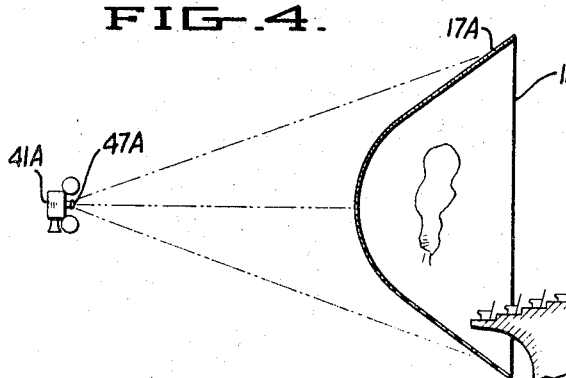
FIG. 6 is a view similar to FIG. 5 of apparatus used in conjunction with rear projection.

A modification is shown in FIGS. 5 and 6 in which similar figures of reference are distinguished by the addition of the letter *a*. In FIG. 5 dome screen 17a is shown disposed with its base 18 substantially vertical as compared with dome 17 as hereinbefore described, which has its base 18 subtantially parallel to the ground. Such a horizontal projection method is referred to herein as a "180° version" of the method hereinbefore described. The subject to be filmed is photographed by means of a camera (not shown) disposed with its lens in a substantially horizontal position. In reproducing such an image, projector 41a is likewise situated with its lens 47a disposed substantially along a horizontal line 57. As shown in FIG. 5, projection is by the conventional front projection technique such that images are projected on screen 17a to produce the original scene as photographed. This arrangement enables a portion of the audience in auditorium 21a to be completely enveloped by screen 17a with respect to normal horizontal vision. The principal purpose and advantage of the "180° system" is that it permits the telling of a story focused centrally on screen 17a which all of the audience may view simultaneously, as opposed to a 360° screen 17 as shown in FIG. 1 in which separate portions of the audience on opposite sides of auditorium 27 view differing portions of the projected image. The modification shown in FIG. 5 may be easily installed in many existing theatres with a minimum of expense. In the modification as shown in FIG. 6, screen 17a is disposed identically as shown in FIG. 5, with projector 47a being behind the screen, employing rear projection technique. Employment of rear screen projection with the "180° system" permits the envelopment of a larger section of the viewing audience than does frontal projection, since front projection must necessarily be over the heads of the audience, and viewers must be seated so as not to intercept or interrupt the image being projected on the screen. The "180° system" permits the telling of a story which may be viewed by the entire audience in a manner in which the audience can feel a high subjective degree of participation with the film being shown together with a "three-dimensional" effect by which realism is greatly enhanced. To enable the present system to be fitted into an existing theatre structure, various portions of screens 17 or 17a may be removed or cut down without substantially decreasing the desired sense of audience participation or subjective three-dimensional effect.

It is important to note that two separate and distinct methods are described for projection for both the "360° system" shown in FIG. 1 and the "180° system" shown in FIGS. 5 and 6. The rear projection method and apparatus shown in FIGS. 1 and 6 relate to the projection of image 39 onto a *convex* surface while the front projection system shown in FIG. 5 relates to the projection of image 39 onto a *concave* surface. The resulting image rectification produced by each method (front and rear projection) is nearly identical as viewed by spectators viewing images produced on the screen 17 or 17a. This is so even though the two methods involve projection of image 39 onto different curvatures.

Rear screen projection onto a convex surface requires more space for the projection throw but allows the audience to be more fully enveloped by the screen, as described above. Frontal projection onto a concave surface requires less space and can easily be fitted into existing theatre structures.

A modification not shown in the drawings is the adaptation of the present apparatus and method to television reproduction. It is readily apparent that a television camera may be substituted for photographic camera 29 and that the anamorphic image 39 may be transmitted electronically or by means of video tape to be projected onto screens 17 or 17a.

Although the foregoing invention has been described in some detail by way of illustration and example for purposes of clarity of understanding it is understood that certain changes in modification may be practiced within the spirit of the invention and the scope of the appended claims.

What is claimed is:
1. A wide field projection system comprising,
   projection means for use with an anamorphic image reproducing a scene covering a hemispherical area of space,
   an enclosed auditorium having seats for an audience,
   a dome-shaped translucent, concave projection screen, substantially enclosing said auditorium, said projection means positioned to project said image from outside said auditorium onto the convex surface of said screen to reproduce on said screen the original scene in substantially proper proportions.
2. A wide field projection system according to claim 1 in which said anamorphic image is recorded on photographic film.

3. A wide field projection system according to claim 1 in which said anamorphic image is electronically transmitted.

4. A wide field projection system according to claim 1 in which said screen is flexible and collapsible and which further comprises,
pressure means to create a lower pressure on the convex side of said screen than on the concave side to cause said screen to assume its proper configuration.

5. A motion picture theatre comprising,
an outer shell,
a dome-shaped projection screen, said screen disposed within said shell with the open end of said screen substantially horizontal, said screen being translucent,
projection means disposed above said screen to project an anamorphic image reproducing a scene covering a hemispherical area of space onto the convex upper surface of said screen to reproduce on the concave surface of said screen the original scene in substantially proper proportions,
an auditorium within said shell, said auditorium disposed below said screen to enable persons within said auditorium to view images on the concave surface of said screen.

References Cited

UNITED STATES PATENTS

| | | |
|---|---|---|
| 2,244,235 | 6/1941 | Ayres. |
| 3,286,590 | 11/1966 | Brueggemann. |
| 3,311,017 | 3/1967 | Eckholm. |

FOREIGN PATENTS

| | | |
|---|---|---|
| 17,434 | 1898 | Great Britain. |
| 540,068 | 2/1956 | Italy. |
| 1,204,643 | 8/1959 | France. |

JULIA E. COINER, *Primary Examiner.*

U.S. Cl. X.R.
88—24; 350—125